(12) United States Patent
Bland

(10) Patent No.: US 11,793,285 B2
(45) Date of Patent: Oct. 24, 2023

(54) COOLER TRASH DISPOSAL ACCESSORY

(71) Applicant: Jaime Ryan Bland, Sarasota, FL (US)

(72) Inventor: Jaime Ryan Bland, Sarasota, FL (US)

( * ) Notice: Subject to any disclaimer, the term of this patent is extended or adjusted under 35 U.S.C. 154(b) by 0 days.

(21) Appl. No.: 17/325,828

(22) Filed: May 20, 2021

(65) Prior Publication Data
US 2022/0369779 A1    Nov. 24, 2022

(51) Int. Cl.
| A01K 97/10 | (2006.01) |
| A45C 13/00 | (2006.01) |
| A45C 11/20 | (2006.01) |
| B65F 1/14 | (2006.01) |
| F25D 3/08 | (2006.01) |
| F16M 13/02 | (2006.01) |

(52) U.S. Cl.
CPC ............ *A45C 13/001* (2013.01); *A45C 11/20* (2013.01); *B65F 1/1415* (2013.01); *F16M 13/02* (2013.01); *F25D 3/08* (2013.01); *F16M 13/025* (2013.01)

(58) Field of Classification Search
CPC ..... A45C 13/001; A45C 11/20; B65F 1/1415; F16M 13/02; F15D 3/08
See application file for complete search history.

(56) References Cited

U.S. PATENT DOCUMENTS

| 2,726,477 | A | * | 12/1955 | Firkins | A01K 97/20 |
| | | | | | 248/278.1 |
| 3,141,257 | A | * | 7/1964 | Stull | A01K 97/20 |
| | | | | | 248/231.71 |
| 5,020,751 | A | * | 6/1991 | Larkin | B65B 67/12 |
| | | | | | D34/6 |
| 5,876,047 | A | | 3/1999 | Dennis | |
| 6,299,116 | B1 | * | 10/2001 | Levesque | A47G 7/044 |
| | | | | | 248/312.1 |
| 7,140,507 | B2 | | 11/2006 | Igloo | |
| 7,753,322 | B1 | * | 7/2010 | Peterson | B65B 67/1233 |
| | | | | | 248/101 |
| 8,123,266 | B1 | * | 2/2012 | Jone | A01K 23/005 |
| | | | | | 294/1.4 |
| 8,181,811 | B1 | * | 5/2012 | Blake | A45B 23/00 |
| | | | | | 248/156 |
| 9,902,416 | B1 | * | 2/2018 | Dockery | B62B 3/02 |
| 10,414,533 | B2 | * | 9/2019 | Davis | B62B 1/266 |
| 2008/0245095 | A1 | | 10/2008 | Kools | |
| 2008/0245793 | A1 | | 10/2008 | Coleman | |
| 2010/0275642 | A1 | | 11/2010 | Klettner | |
| 2015/0266551 | A1 | * | 9/2015 | Sanchez | B63B 25/002 |
| | | | | | 248/220.22 |

* cited by examiner

*Primary Examiner* — Amy J. Sterling
(74) *Attorney, Agent, or Firm* — Smith Patent, LLC; Chalin A. Smith

(57) ABSTRACT

A trash disposal accessory (1) for a cooler (3) removably attachable to a side of a cooler under a top cover (2), said accessory having an attachment bracket (4) having a top rim (5) with a n opening (6) a planar extension (10) and a perpendicularly attached handle (12) for insertion into a strap slot (11) of certain coolers. A bracket with a clamping handle (16) is provided for use with coolers without strap slots. The accessory has a trash holding bag (7) which is removably attached to the bracket by a draw cord (8) sewn around a top opening and which can be tightened or loosened through a cord lock (9).

13 Claims, 5 Drawing Sheets

COOLER TRASH DISPOSAL ACCESSORY

BACKGROUND OF THE INVENTION

This invention relates to coolers, also known as ice chests, used to store food and drinks and more particularly to an accessory for placing and retaining trash, such as cans, wrappers and so forth.

Coolers are a very popular and essential commodity for carrying and storing food and drinks when conventional refrigeration is not available, such as during activities including outdoor picnics, boating, traveling and other events. In many locations where such activities occur, trash disposal containers or facilities are not readily available and thus people encounter a decisional problem when it comes time to dispose of trash, such as cans, food wrappers and so forth. Some people bring a bag with them to dispose of trash and others just throw the trash back in the cooler which risks contaminating any remaining contents in the cooler. Unfortunately, however, many people just throw or leave their trash behind, which explains why so many areas where activities occur, such as parks, water bodies and beaches, are strewn with cans, bottles and other litter.

Thus, a problem exists with the disposal of trash from coolers which the present invention is designed to remedy.

Other attempts to remedy this problem have included many references for cooler accessories, such as U.S. Pat. No. 5,876,047 issued to Dennis on Mar. 2, 1999 and U.S. Pat. No. 7,140,507 issued to Maldonado et al. on Nov. 28, 2006 and assigned to Igloo Products Corporation, but none disclose a trash accessory like the present invention.

SUMMARY OF THE INVENTION

The primary object of the present invention is to provide a trash disposal accessory for a cooler.

Another object of the present invention is to provide such an accessory that can be easily and quickly attached to a cooler when necessary and removed when not in use.

Even another object of the present invention is to provide such an accessory that does not require a cooler to be modified in order to use it.

A further object of the present invention is to provide such an accessory that cleans up the environment by helping to eliminate trash and litter in recreation areas.

The present invention fulfills the above and other objects by providing a cooler trash disposal accessory having a bracket for attachment to an inner side of a cooler under a top cover of a cooler, said bracket having a vertical holding handle for insertion into a side of the cooler, a planar extension extending outward from the handle and trash bag holding rim attached to said extension. A trash bag having a top opening is removably attachable around a rim. The trash bag holding rim preferably has a top perimeter flange and a lower perimeter flange around it circumference with a recess in between the flanges. The trash bag is removably attachable to the rim by a draw cord enclosed around the top of the trash bag inserted in the recess between the top and bottom perimeter flanges, said cord running through a cord lock on the cord to tighten the bag in the recess. An inner clamping handle parallel to the vertical holding handle which is adjustable in distance from the vertical holding handle and tightened in desired distance to fit a width of a side of a cooler is provided for use with coolers without strap slots. The inner clamping handle is adjustable by means of a slot in the planar extension into which the clamping handle is movable to encompass a side of a cooler between the clamping handle and the vertical holding handle. A wing nut on top of the clamping handle can be tightened onto a bolt to hold the clamping handle in a desired position.

The above and other objects, features and advantages of the present invention should become even more readily apparent to those skilled in the art upon a reading of the following detailed description in conjunction with the drawings wherein there is shown and described illustrative embodiments of the invention.

DESCRIPTION OF THE DRAWINGS

In the following detailed description, reference will be made to the attached drawings in which.

DESCRIPTION OF THE PREFERRED EMBODIMENTS

Figure 1:
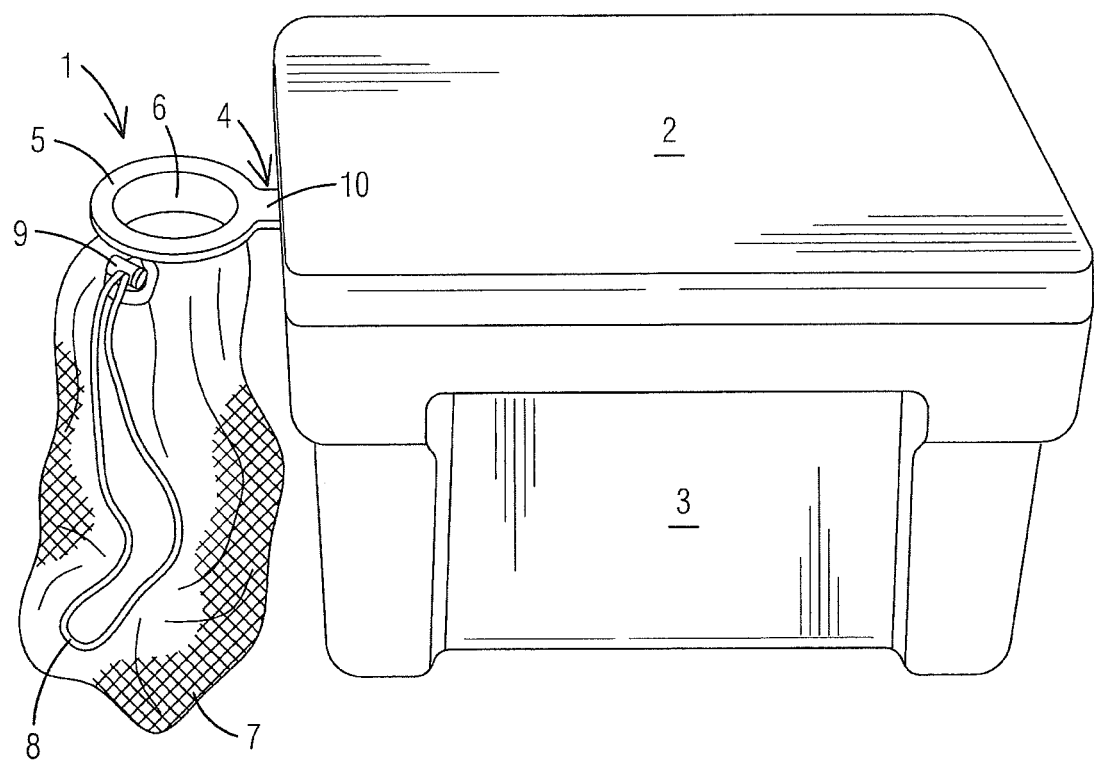
FIG. 1 is a perspective view of the cooler trash disposal accessory of the present invention attached to a cooler in a closed mode.
Figure 2:
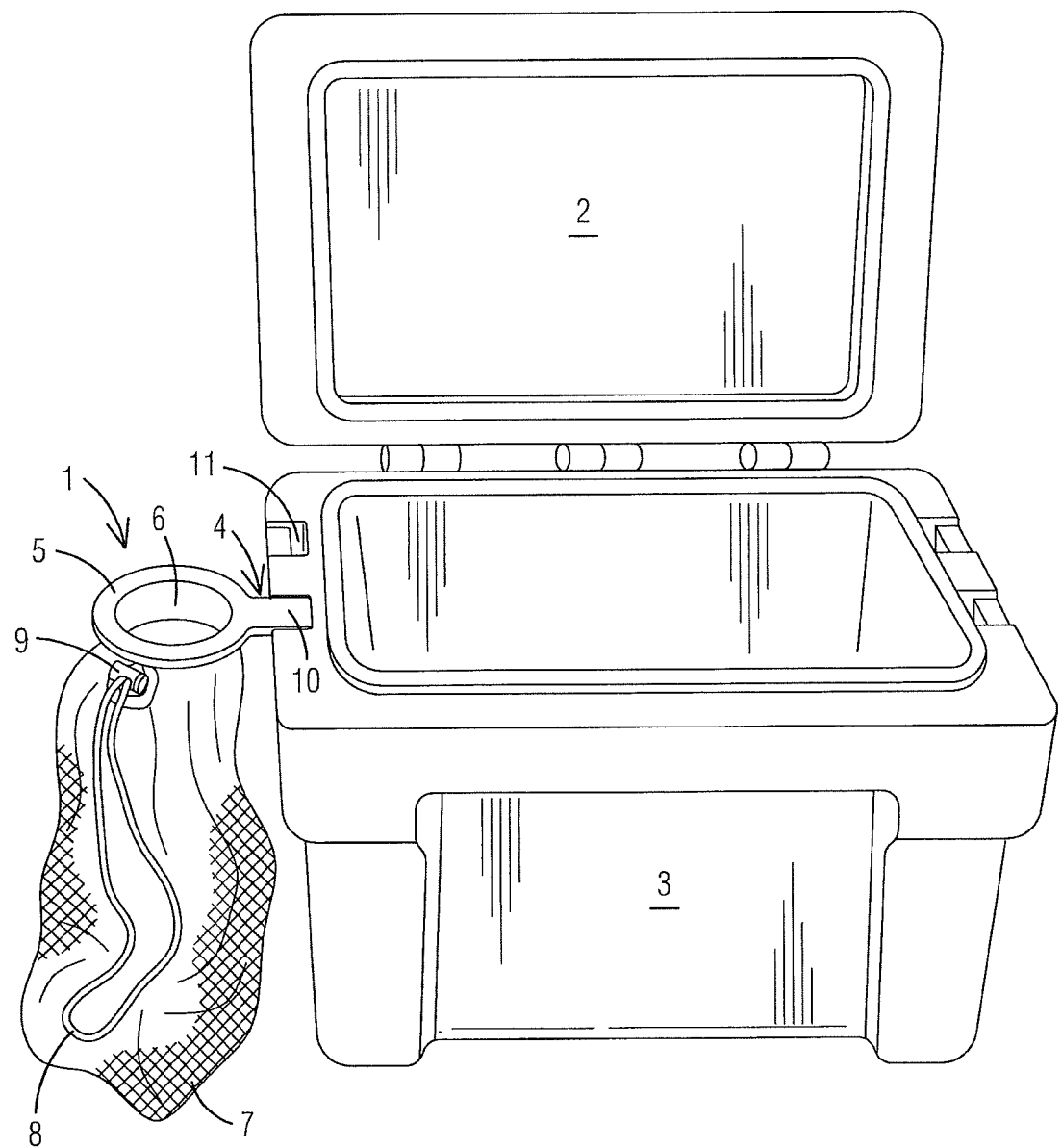
FIG. 2 is a perspective view of the cooler trash disposal accessory of the present invention attached to a cooler in an open mode.

For purposes of describing the preferred embodiment, the terminology used in reference to the numbered accessories in the drawings is as follows:

1. cooler trash disposal accessory, generally
2. cooler top cover
3. cooler
4. attachment bracket, generally
5. top perimeter flange of attachment bracket
6. inlet
7. trash bag
8. pull tightening cord
9. cord lock
10. extension of adjustment bracket
11. tie down strap slot
12. vertical holding handle of attachment bracket
13. bag top
14. bottom perimeter flange of adjustment bracket
15. bag holding recess
16. inner clamping handle
17. adjustment tightening nut
18. adjustment slot
19. tightening screw for inner clamping handle Referring now to the FIGS. 1 and 2, perspective views of the trash disposal accessory 1 of the present invention are illustrated as attached to a cooler in closed and open modes, respectively. The trash disposal accessory 1 has two major components, a cooler attachment bracket 4 and a trash holding bag 7 removably affixed around a perimeter of a rim 5 of the attachment bracket 4. The trash bag 7 is securely held to the bracket 4 by a cord 8 around the inlet 6 which can be tightened by pulling on the cord 8 through a conventional cord lock 9. Conversely, the trash bag 8 can be removed as needed for trash disposal by depressing the cord lock 9 to loosen the cord 8. As shown, the trash disposal accessory 1 is designed to be attached to a side of a body 3 under a top cover 2 of a cooler. The attachment bracket 4 may differ depending on the type of cooler. As shown in FIGS. 1 and 2, the attachment bracket 4 is attached to an Igloo Sportsman® cooler which contains strap slots 11 on a side as so illustrated in FIG. 3 the bracket has a vertical holding handle 12 extending from the top extension 10 which allows the handle 12 the bracket 4 to be easily insertable into the strap slots 11.

Figure 3:
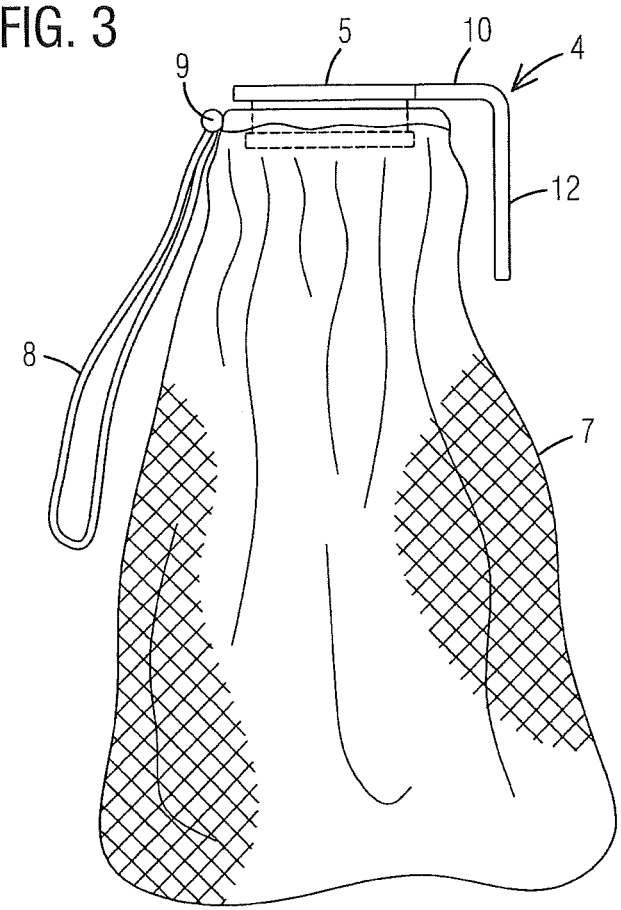
FIG. 3 is a side view of the cooler trash disposal accessory of the present invention by itself.

FIG. 3 is a side illustration of the trash disposal accessory by itself showing the attachment bracket 4 having a top rim 5 with planar extension 10 from the side having sufficient length to allow a vertical handle 12 to be inserted into a strap slot 11 or over a side of a cooler 3. The trash bag 7 is also shown attached under the rim of the attachment bracket 4 by a pull cord 8 through a cord lock 9. Other means not shown of attaching the trash bag 7 to the attachment bracket 4 in lieu of a pull cord and cord lock include hook and loop fastening material.

Figure 4:
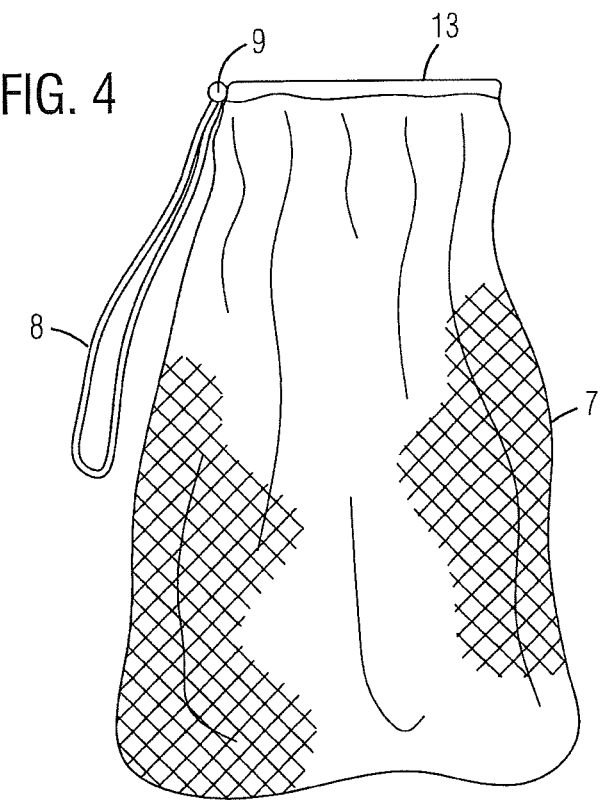
FIG. 4 is a side view of the trash bag of the present invention by itself.

FIG. 4 illustrates the trash collection bag 7 having an open bag top 13 around which a cord 8 is enclosed so the cord 8 can be pulled through a cord lock 9 to decrease the circumference of the bag top opening 13 to secure it to the bracket 4 or when in use or conversely, loosened to decrease the circumference of the top opening 13 as necessary to remove the trash bag 7 from the bracket 4 for trash disposal.

Figure 5:
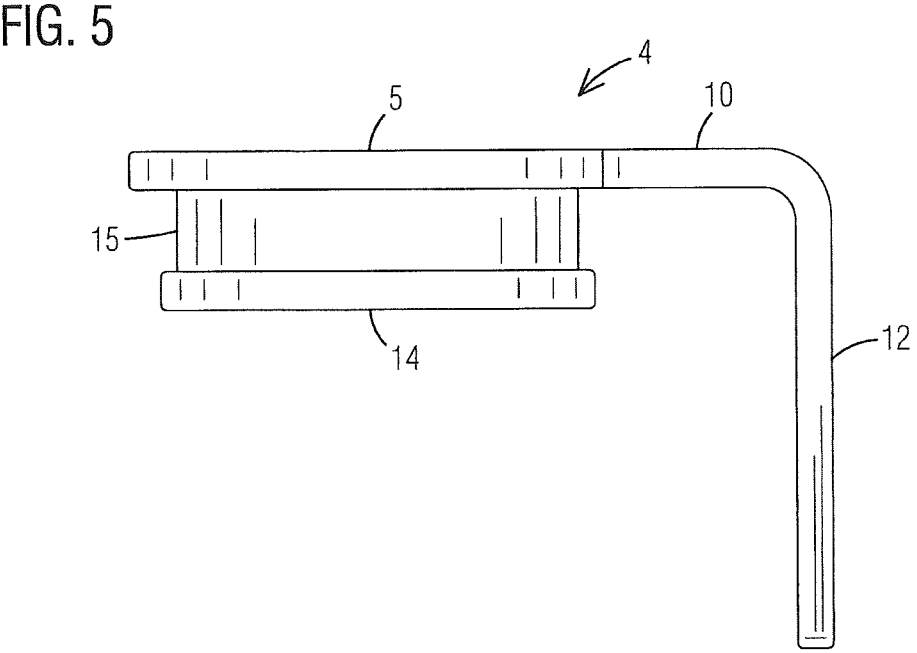
FIG. 5 is a side view of the trash bag holding bracket of the present invention by itself.

FIG. 5 illustrates the attachment bracket 4 by itself showing the top perimeter rim 5, the planar extension 10 and vertical cooler holding handle 12 previously discussed. With the trash bag 7 no longer in place the bag holding recess 15 and lower perimeter flange 14 can be seen.

Figure 6:
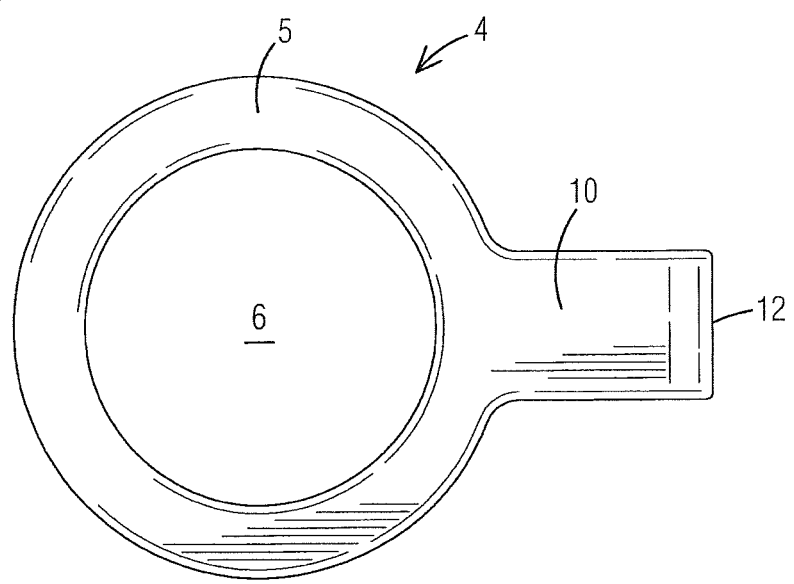
FIG. 6 is a top view of the trash bag holding bracket of the present invention by itself.

FIG. 6 illustrates a top view of the attachment bracket 4 showing the top perimeter rim 5 encircling an inlet 6 for trash insertion with a side extension 10 with vertical cooler holding handle 12 attached perpendicularly thereto.

Figure 7:
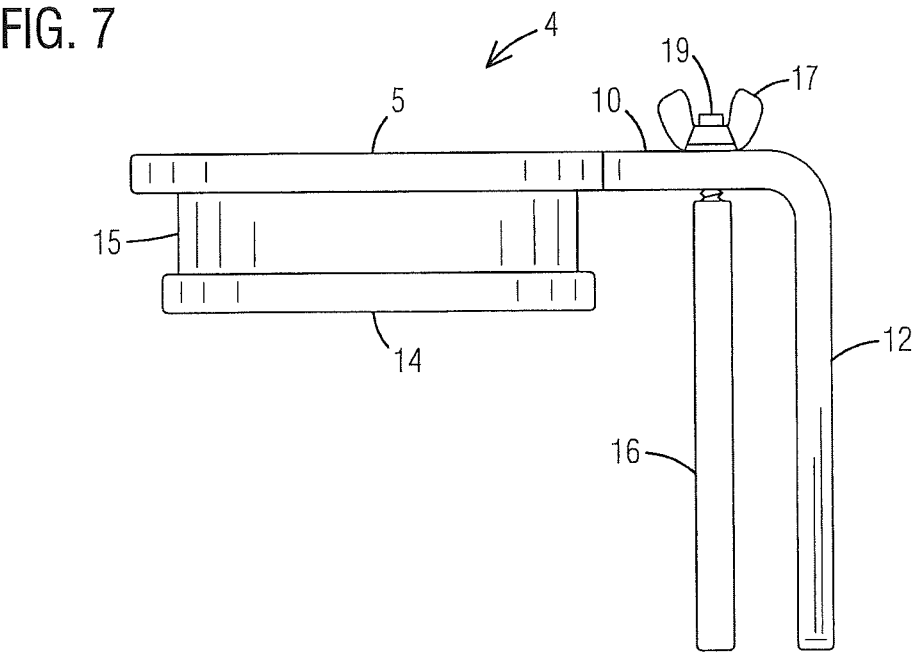
FIG. 7 is a side view of another trash bag holding bracket of the present invention with an adjustable attachment bracket.
Figure 8:
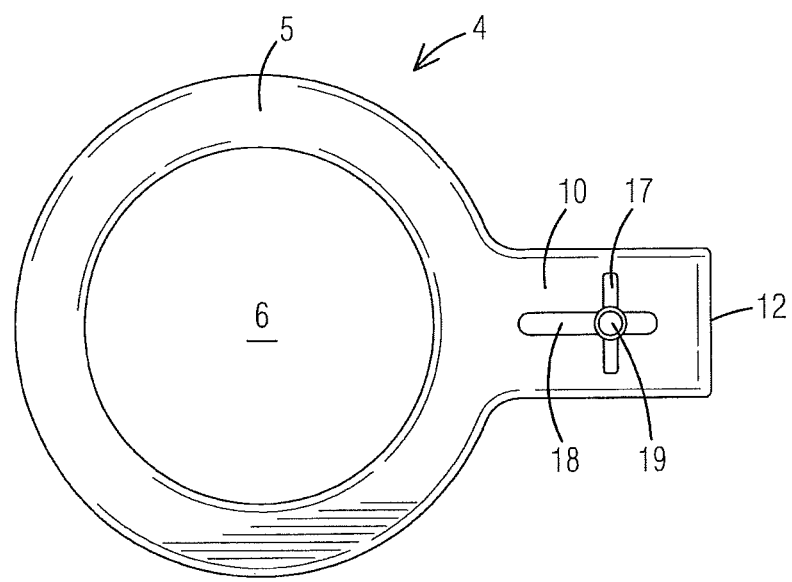
FIG. 8 is a top view of the adjustable trash bag holding bracket of FIG. 7.

FIGS. 7 and 8 illustrate another version of the cooler attachment bracket 4 in side and top views, respectively, which is designed for use when a cooler does not have strap slots on a side to insert the handle 12 to ensure more secure attachment to a cooler. This version has a second vertically-oriented handle 16 extending perpendicularly from the extension 10 which can be moved inward or outward in a slot 18 in the extension 10 to accommodate the width of a side of a particular cooler by loosening a butterfly nut 19 around a screw or bolt 17 on top of the handle 16 and tightening at a desired position.

It is to be understood that while a preferred embodiment of the invention is described, it is not to be limited to the specific form or arrangement of parts herein described and shown. It will be apparent to those skilled in the art that various changes may be made without departing from the scope of the invention and the invention is not to be considered limited to what is shown and described in the specification and/or drawings.

I claim:

1. A trash disposal accessory for a cooler characterized by an insulating body and top cover, wherein said insulated body has an upper rim that seals against said top cover when in a closed position and includes one or more integral slots, said accessory comprising:
    (a) a bracket of one piece unitary construction configured for ready attachment to and removal from a side of said cooler under the top cover of said cooler, said bracket consisting of (i) a vertical portion defining a handle that extends into one of said one or more slots and (ii) a horizontal portion consisting of a planar extension that extends outwardly from said handle, projects proximally past an outer edge of said top cover, and terminates in an open rim for holding a trash bag; and
    (b) a trash bag having a top opening which is removably attachable around said open rim.

2. The trash disposal accessory of claim 1, wherein said open rim has a top perimeter flange and a bottom perimeter flange that define an annular recess therebetween.

3. The trash disposal accessory of claim 2, wherein said trash bag is removably attachable to the annular recess of said open rim by means of a draw cord enclosed around the top opening of said trash bag.

4. The trash disposal accessory of claim 2 wherein the trash bag is removably attachable to said open rim by means of a first section of hook and loop fastening material disposed around the top opening of said trash bag attached to a complementary second section of hook and loop fastening material disposed in the annular recess between said top and bottom flanges.

5. The trash disposal accessory of claim 3, wherein said draw cord further includes a cord lock that serves to secure the top opening of said trash bag to the open rim of said bracket.

6. The trash disposal accessory of claim 1, wherein said trash bag is fabricated from a mesh material.

7. A trash disposal accessory for attachment to a cooler, said accessory comprising:
    a. a cooler attachment bracket for ready attachment to and removal from a side of said cooler, under a top cover of said cooler, wherein said bracket is comprised of (i) a vertical handle for insertion into a body of the cooler, (ii) a planar extension extending outwardly from said handle, (iii) an open rim attached to said planar extension for holding a reusable trash bag; and (iv) a clamping handle disposed parallel to the vertical handle and affixed to a horizontal slot in said planar extension, wherein the spacing between the clamping handle and the vertical handle may be slidably adjusted by means of a fastener that serves to tighten the clamping handle in position such that the side of said cooler is gripped between said vertical and clamping handles; and
    b. a trash bag having a top opening that may be removably secured around said open rim.

8. The trash disposal accessory of claim 7, wherein said fastener is a wing nut.

9. The trash disposal accessory of claim 7, wherein said open rim has a top perimeter flange and a bottom perimeter flange that define an annular recess therebetween.

10. The trash disposal accessory of claim 9, wherein said reusable trash bag is removably secured to the annular recess of said open rim by means of a draw cord disposed about the top opening of said trash bag.

11. The trash disposal accessory of claim 10, wherein said draw cord further includes a cord lock that serves to secure the top opening of said trash bag to the open rim of said bracket.

12. The trash disposal accessory of claim 7, wherein said reusable trash bag is removably secured to said open rim by means of a first section of hook and loop material disposed about the top opening of said trash bag attached to a complementary second section of hook and loop fastening material affixed to said open rim.

13. The trash disposal accessory of claim 7, wherein said bracket is of one-piece unitary construction.

\* \* \* \* \*